(12) United States Patent
Jorgensen

(10) Patent No.: US 7,211,744 B2
(45) Date of Patent: May 1, 2007

(54) SNAP-IN CABLE CONNECTOR (75) Inventor: Robert W. Jorgensen, Niles, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/887,452

(22) Filed: Jul. 9, 2004

(65) Prior Publication Data
US 2006/0005988 A1 Jan. 12, 2006

(51) Int. Cl.
H02G 3/18 (2006.01)
(52) U.S. Cl. .................. 174/668; 174/650; 174/654; 16/21; 439/296
(58) Field of Classification Search .......... 174/65 R, 174/51, 65 G, 650, 659, 668; 16/2.1, 2.2; 439/607–610, 296, 631, 352–358
See application file for complete search history.

(56) References Cited

U.S. PATENT DOCUMENTS 4,012,578 A * 3/1977 Moran et al. ............... 174/51
4,190,222 A 2/1980 Appleton
4,299,363 A 11/1981 Datschefski
4,302,035 A 11/1981 Ochwat
4,640,433 A 2/1987 Jorgensen
4,880,387 A 11/1989 Stikeleather
5,285,013 A 2/1994 Schnell
5,374,017 A 12/1994 Martin
5,442,141 A 8/1995 Gretz
5,607,323 A 3/1997 Foster
6,114,630 A * 9/2000 Gretz ................ 174/65 R
6,143,982 A 11/2000 Gretz
6,380,483 B1 * 4/2002 Blake ................ 174/65 R

* cited by examiner

Primary Examiner—Dhiru R. Patel
(74) Attorney, Agent, or Firm—Marcus R. Mickney; Mark S. Bicks; Alfred N. Goodman (57) ABSTRACT

A connector for an electrical box having a base that has an opening. A cavity is formed by a wall extending from the base. The cavity is aligned with the opening to form a passageway through the connector to receive electrical cable. At least two fingers extend inwardly and toward the base from an inner surface of the wall. At least two tabs extend outwardly and toward the base from an outer surface of the wall to retain the junction box between the at least two tabs and the base.

36 Claims, 7 Drawing Sheets

SNAP-IN CABLE CONNECTOR

FIELD OF THE INVENTION

The present invention relates to a snap-in electrical connector to secure electrical cables to an electrical junction box. More particularly, the present invention relates to a snap-in electrical connector securable to a knockout of an electrical box from inside the electrical box. Still more particularly, the present invention relates to a snap-in electrical connector securable to a two-stage knockout of an electrical box from inside the box. The snap-in electrical connector base overlies a portion of the electrical box inner wall beyond the outer knockout to prevent accidental removal of the outer knockout and snap-in electrical connector.

BACKGROUND OF THE INVENTION

Snap-in electrical connectors are used to secure electrical cables to electrical outlet boxes. Existing connectors snap into openings in the electrical boxes from the outside of the electrical box. Generally, existing snap-in connectors have tabs that provide the snap-in connection between the connectors and the electrical boxes. Once the connectors are inserted, the tabs rest against inner walls of the electrical boxes.

Snap-in cable connectors are frequently used in electrical boxes having multistage knockouts. A multistage knockout has a plurality of knockouts of increasing size. A two-stage knockout has one larger knockout, i.e., the outer knockout, surrounding a smaller, inner knockout. Per industry standard, the inner knockout is punched into the box. The outer knockout is punched outwardly. The metal around the knockout is displaced during the punching process so that the knockout cannot go back through the opening around which it is punched. Thus, the outer knockout in a two-stage knockout cannot be pushed back in through the electrical box, but the outer knockout can be pulled out of the box.

One problem with existing snap-in cable connectors arises when those connectors are used in electrical boxes having multi-stage knockouts. The connector is snapped into the box from outside through the removed inner knockout, so that the tabs rest against the outer knockout. A cable or multiple cables are then inserted into the electrical box through the snap-in connector. Forces exerted on the cables are then transferred to the connector. Thus, a strong pull on a cable frequently pulls the connector and outer knockout out of the electrical box. A need exists for a snap-in cable connector usable with a multistage knockout that prevents the occurrence of accidental outer knockout removal.

Another problem with existing snap-in cable connectors is that a major portion of the connector resides within the electrical box, thereby taking u
valuable space within the electrical box. This results in an electrical box lacking adequate clearance between the cables and devices in the box. Furthermore, fasteners often come into contact with the connector body within the electrical box, thereby requiring a shorter fastener to be used. A need exists for a snap-in cable connector in which a major portion of the connector is outside of the electrical box to provide a less cramped electrical box.

A need exists for an improved electrical connector.

SUMMARY OF THE INVENTION

Accordingly, it is a primary object of the present invention to provide an improved electrical connector.

Accordingly, another object of the present invention to provide an electrical connector that snaps into an opening of an electrical box from within the electrical box.

Accordingly, another object of the present invention is to provide an electrical connector usable with a multistage knockout that prevents accidental removal of the outer knockout and snap-in cable connector from the electrical box.

Accordingly, another object of the present invention is to provide an electrical connector in which a major portion of the connector is outside of the electrical box to provide more space within the electrical box.

The foregoing objects are basically attained by providing a connector for an electrical box having a base that has an opening. A cavity is formed by a wall extending from the base. The cavity is aligned with the opening to form a passageway through the connector to receive electrical cable. At least two fingers extend inwardly and toward the base from an inner surface of the wall. At least two tabs extend outwardly and toward the base from an outer surface of the wall to retain the junction box between the at least two tabs and the base.

The foregoing objects are also attained by providing a method of inserting the connector through an opening of an electrical box from inside the electrical box. At least two tabs of the connector that extend outwardly and toward a base of the connector are positioned against an outer surface of the wall of the electrical box. An inner surface of the base of the connector is positioned against an inner surface of the wall of the electrical box.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings that form a part of the original disclosure.

DETAILED DESCRIPTION OF THE INVENTION

As shown in FIGS. 1–21, an electrical connector 11 is insertable through an opening 15 of an electrical box 13 from within the electrical box. Retaining tabs 51 and 53 are positioned against an outer surface 14 of the electrical box wall 17. The base 21 of the connector is positioned against the inner surface 16 of the electrical box wall 17. Fingers 41 and 42 of the connector receive electrical cables 22. The base 21 is larger than the electrical box opening to prevent the snap-in connector from being pulled through the electrical box opening 15 when a force is exerted on the cables 22 held by the connector.

An electrical connector 11 according to a first embodiment of the present invention is shown in FIGS. 1–7. An electrical connector 211 according to a second embodiment of the present invention is shown in FIGS. 8–13. An electrical connector 311 according to a third embodiment of the present invention is shown in FIGS. 14–19. Substantially similar features of the connectors will have the same base reference numeral with the features of the second embodiment being in the 200 series and the features of the third embodiment being in the 300 series.

Figure 1:
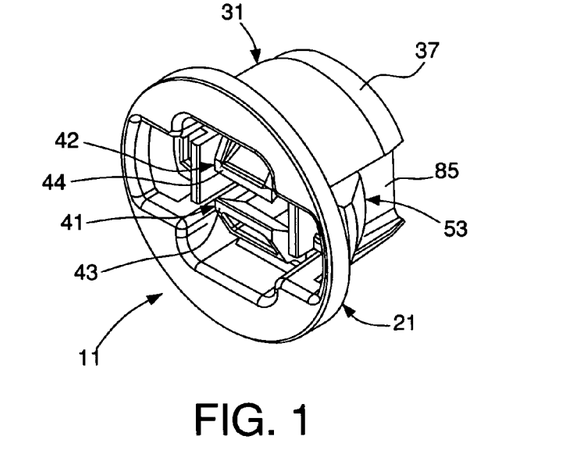
FIG. 1 is a perspective view of an electrical connector according to a first embodiment of the present invention.
Figure 2:
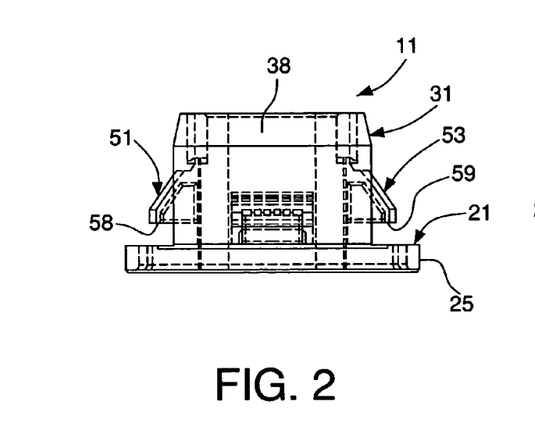
FIG. 2 is a front elevational view of the electrical connector of FIG. 1.
Figure 3:
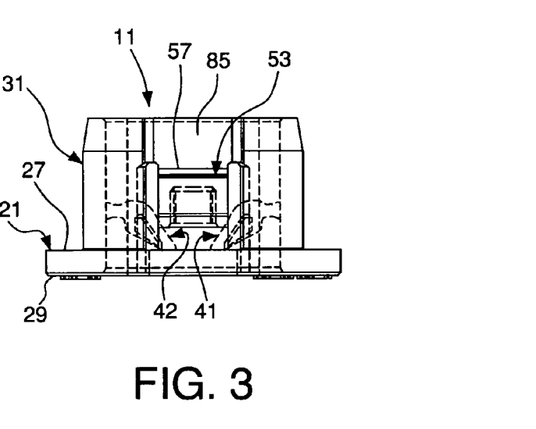
FIG. 3 is side elevational view of the electrical connector of FIG. 1.
Figure 4:
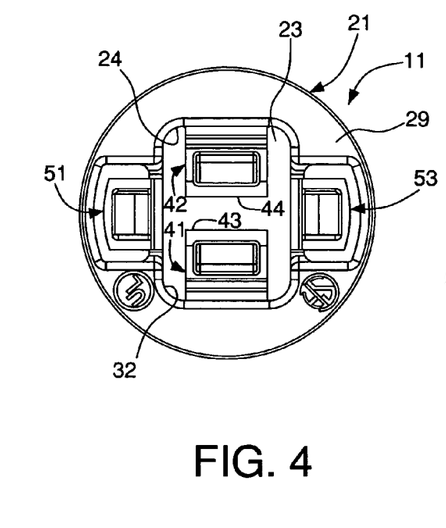
FIG. 4 is a bottom plan view of the electrical connector of FIG. 1.
Figure 5:
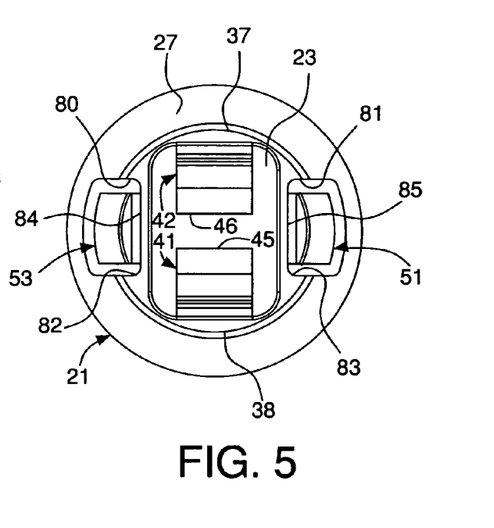
FIG. 5 is a to
plan view of the electrical connector of FIG. 1.

The electrical connector 11 has a base 21, as shown in FIGS. 1–7. An inner perimeter 24 defines an opening 23 in the base 21. The base 21 has an upper surface 27 and a lower surface 29, as shown in FIGS. 4 and 5 respectively. The upper surface 27 of the base 21 is positioned proximal the inner surface 16 of the electrical box wall 17 when the connector is inserted through the opening 15 in the electrical box 13. An outer perimeter 25 of the base 21 is larger than the electrical box opening 15 to prevent the snap-in connector 11 from being drawn completely through the electrical box opening. Preferably, the outer perimeter 25 of the base 21 of the electrical connector 11 is substantially circular.

Figure 6:
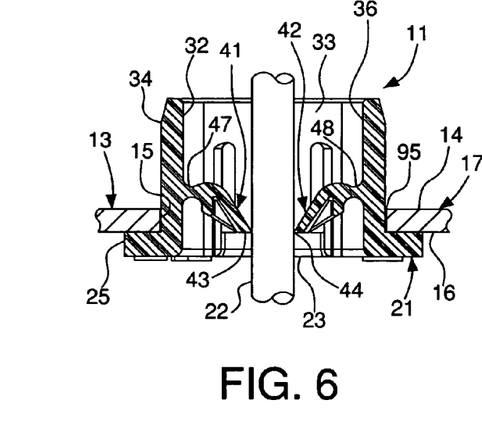
FIG. 6 is a side elevational view in cross-section of the electrical connector of FIG. 1 showing the electrical connector inserted in an opening in an electrical box and receiving an electrical cable.
Figure 7:
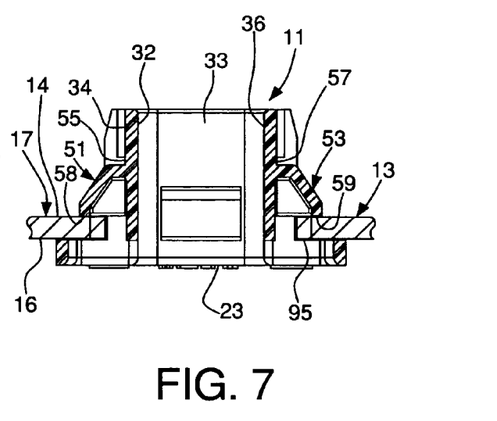
FIG. 7 is a front elevational view in cross-section of the electrical connector of FIG. 1 inserted in an opening in an electrical box.
Figure 8:
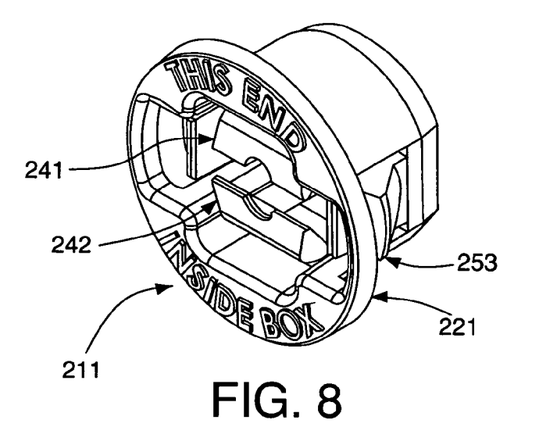
FIG. 8 is a perspective view of an electrical connector according to a second embodiment of the present invention.
Figure 9:
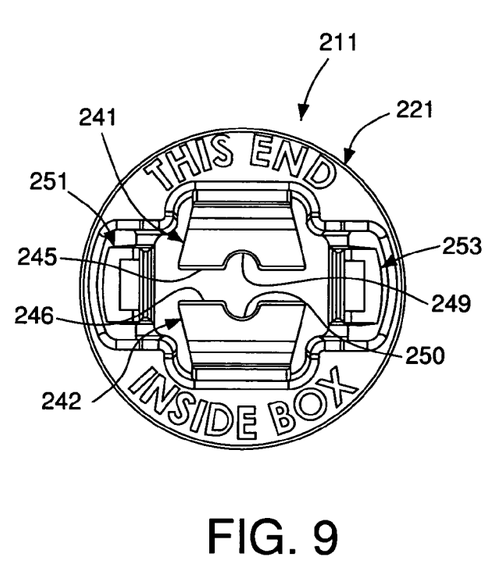
FIG. 9 is a bottom plan view of the electrical connector of FIG. 8.
Figure 10:
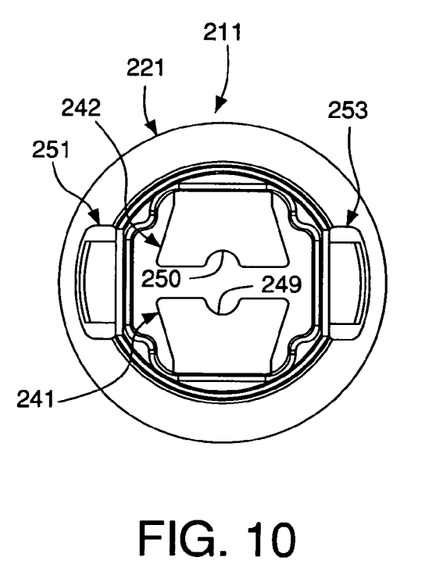
FIG. 10 is a to
plan view of the electrical connector of FIG. 8.
Figure 11:
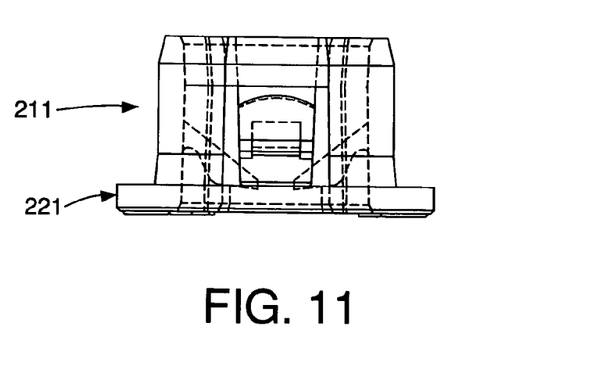
FIG. 11 is a side elevational view of the electrical connector of FIG. 8.
Figure 12:
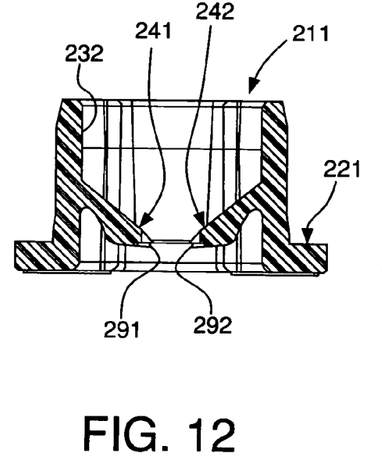
FIG. 12 is a side elevational view in cross section of the electrical connector of FIG. 8.

A wall 31 extending upwardly from the upper surface 27 of the base forms a cavity 33 in the connector 11, as shown in FIGS. 6–7. The wall 31 has an inner surface 32 and an outer surface 34. The cavity 33 is aligned with the opening 23 in the base 21 to form a passageway 36 through the connector o receive the electrical cable 22 therethrough.

Alternatively, wall 31 has a first wall 37 and a second wall 38. The first and second walls extend upwardly from the upper surface 27 of base 21. The first wall 37 has a first end 80 and a second end 81. The second wall 38 has a first end 82 and a second end 83. A third wall 84 connects the first ends 80 and 82 of the first and second walls 37 and 38. A fourth wall 85 connects the second ends 81 and 83 of the first and second walls 37 and 38. Preferably, the first and second walls 37 and 38 are substantially arcuate. Preferably, the third and fourth walls 84 and 85 are substantially parallel.

At least two fingers 41 and 42, as shown in FIGS. 1, 3, 4 and 6, extend inwardly and toward the base from an inner surface 32 of the wall 31. The fingers 41 and 42 are resiliently connected to the inner surface 32 of the wall 31 with arms 47 and 48 (FIG. 6) to accommodate various numbers of cables and various cable sizes within the electrical connector 11. Thicker arms 47 and 48 provide stiffer and stronger fingers 41 and 42. Preferably, each finger has a substantially planar surface 43 and 44 to facilitate cable retention within the connector 11. Preferably, the ends 45 and 46 of the fingers are slightly rounded or contoured to further facilitate cable retention within the electrical connector 11. Preferably, fingers 41 and 42 are diametrically opposed.

At least two tabs 51 and 53 extend outwardly and toward the base 21 from an outer surface 34 of the wall 31 to retain the electrical box between the at least two tabs and the base. The first and second tabs 51 and 53 are resiliently connected to the wall 31 with arms 55 and 57. Preferably, the first and second tabs 51 and 53 are diametrically opposed. Preferably, lower edges 58 and 59 of the tabs 51 and 53 have planar surfaces that are substantially parallel to outer surface 14 of the electrical box wall 17.

Figure 13:
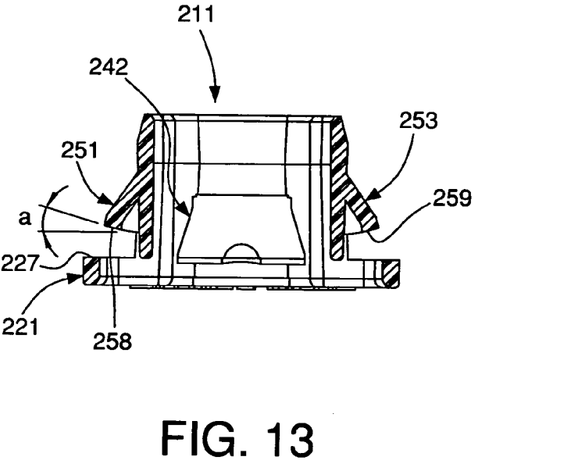
FIG. 13 is a front elevational view in cross section of the electrical connector of FIG. 8.
Figure 14:
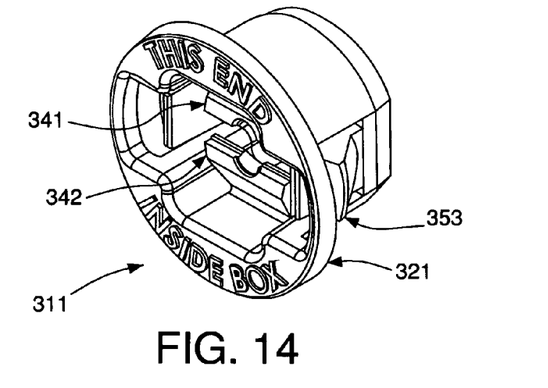
FIG. 14 is a perspective view of an electrical connector according to a third embodiment of the present invention.
Figure 15:
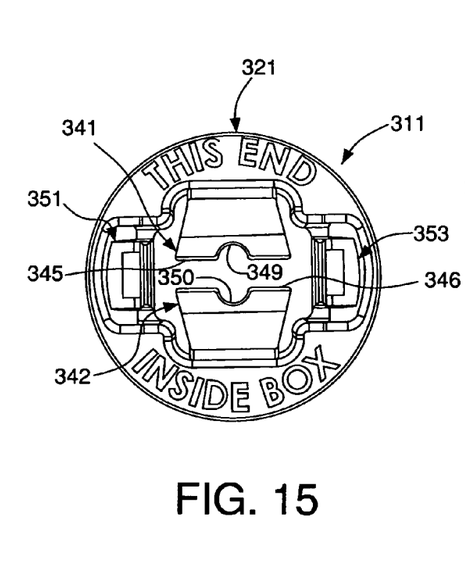
FIG. 15 is a bottom plan view of the electrical connector of FIG. 14.
Figure 16:
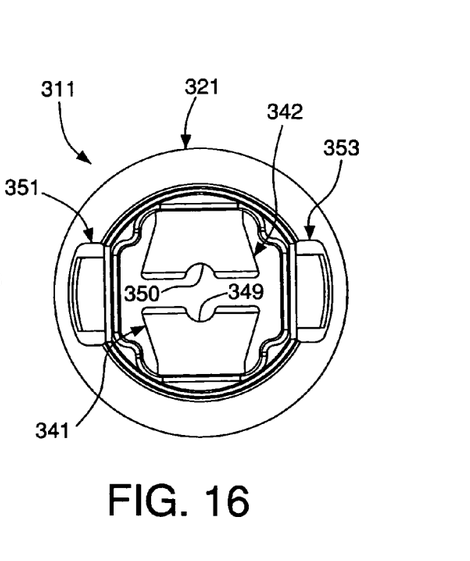
FIG. 16 is a to plan view of the electrical connector of FIG. 14.
Figure 17:
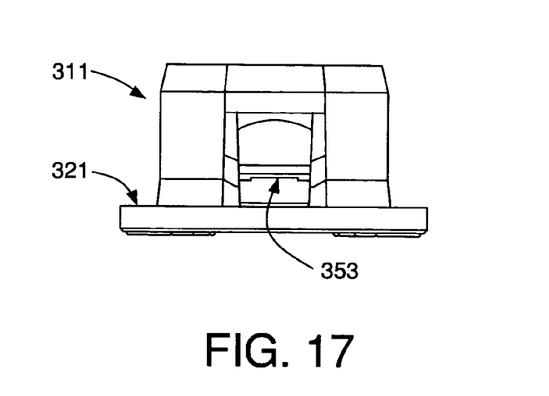
FIG. 17 is a side elevational view of the electrical connector of FIG. 14.
Figure 18:
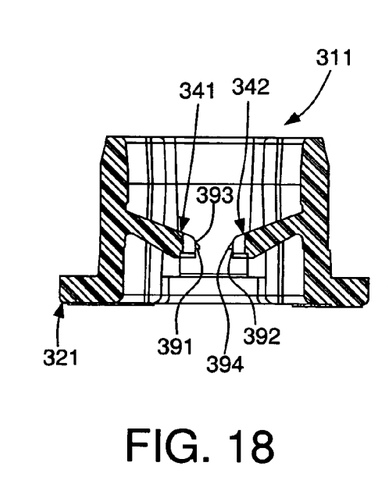
FIG. 18 is a side elevational view in cross section of the electrical connector of FIG. 14.

A second embodiment of an electrical connector 211 according to the present invention is shown in FIGS. 8–13, 20 and 21, and is similar to the connector 11 described above. However, in FIGS. 8–13, 20 and 21, the first and second tabs 251 and 253 have lower edges 258 and 259 that are angled, as shown in FIG. 13. Preferably, the lower edges 258 and 259 angle upwardly away from the upper surface 227 of the base 221. The angled lower edges 258 and 259 allow the electrical connector 211 to be secured to support walls of various thicknesses. The angled lower edges 258 and 259 allow the first and second tabs 251 and 253 to accommodate a larger range of wall thicknesses than non-angled lower edges, such as lower edges 58 and 59 shown in FIG. 2. Preferably, the angle "a" (FIG. 13) of the lower edges is approximately 13 degrees. The distal ends 245 and 246 of first and second fingers 241 and 242 have recesses 249 and 250 adapted to receive substantially round cables. The rounded or arcuate recesses 249 and 250 provide more contact area with received round cables, thereby preventing damage to the cable jackets that may be caused when round cables are received by substantially planar edges since there is less contact area. Preferably, the recesses 249 and 250 are substantially oval or circular.

Figure 21:
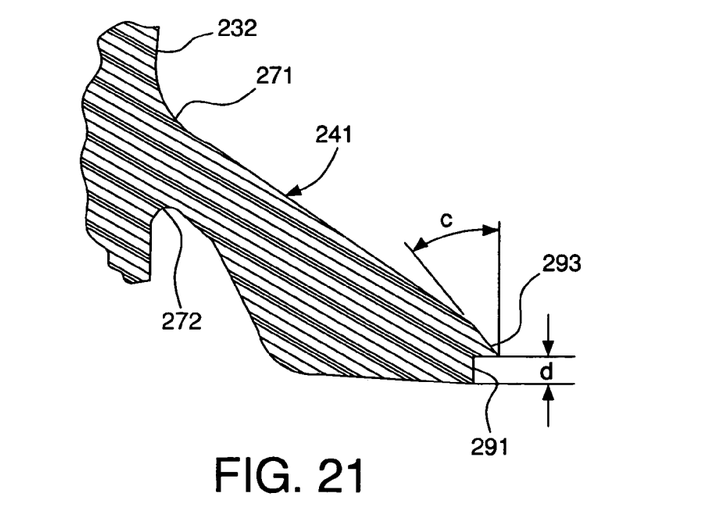
FIG. 21 is an enlarged elevational view in cross section of a finger of the electrical connector of FIG. 12.

An enlarged view of the first finger 241 showing the stepped surface 291 and tooth 293 is shown in FIG. 21. Preferably, the upper and lower connection surfaces 271 and 272 between the first finger 241 and the inner surface 232 have a radius, as shown in FIG. 21, to provide a strong and flexible finger. An angled portion having an angle "c" at the distal end of the finger adds material under the tooth 293 to strengthen the tooth, while decreasing the angle at which the tooth grips the cable to prevent damage to the gripped cable. Preferably, the angle "c" is approximately 40 degrees. The step 291 in the tooth 293 limits the penetration of the tooth into the cable jacket. The depth "d" of the step 291 is preferably approximately half the thickness of the cable jacket, thereby providing a secure grip on the cable without damaging the cable jacket by cutting or tearing. The finger 241 shown in FIG. 21 may be used with any embodiment of the electrical connector of the present invention.

Figure 19:
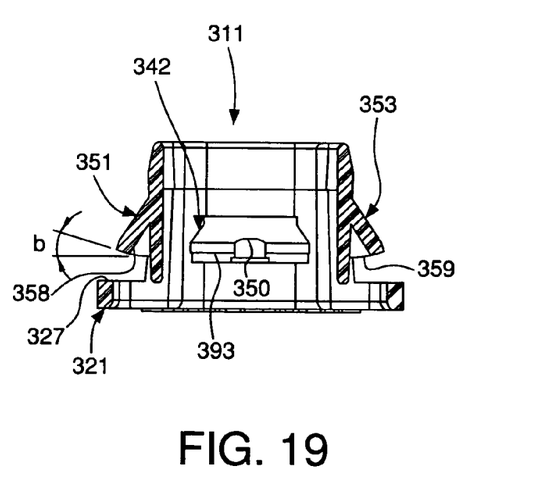
FIG. 19 is a front elevational view in cross section of the electrical connector of FIG. 14.

A third embodiment of an electrical connector 311 according to the present invention is shown in FIGS. 14–19 and 21, and is similar to connectors 11 and 211 described above. The first and second tabs 351 and 353 have lower edges 358 and 359 that are angled, as shown in FIG. 19, which is similar to that shown in FIG. 13. Preferably, the lower edges 358 and 359 angle upwardly away from the upper surface 327 of the base 321. The angled lower edges 358 and 359 allow the electrical connector 311 to be secured to support walls of various thicknesses. The angled lower edges 358 and 359 allow the first and second tabs 351 and 353 to accommodate a larger range of wall thicknesses than non-angled lower edges, such as lower edges 58 and 59 shown in FIG. 2. Preferably, the angle "b" of the lower edges is approximately 13 degrees, unlike connectors 11 and 211. The distal ends 345 and 346 of first and second fingers 341 and 342 of connector 311 have recesses 349 and 350 adapted to receive substantially round cables. The rounded recesses 349 and 350 provide more contact area with received round cables, thereby preventing damage to the cable jackets that may be caused when round cables are received by substantially planar edges since there is less contact area. Stepped surfaces 391 and 392 and teeth 393 and 394 provide a better grip on received cable jackets. The inwardly angled fingers 341 and 342 allow for easy insertion of cables, while preventing inserted cables from being withdrawn back through the fingers.

Preferably, the connectors 11, 211 and 311 are unitarily formed. Preferably, the connectors 11, 211 and 311 are made of a plastic material, such as a polycarbonate or PVC.

Assembly and Disassembly

Figure 20:
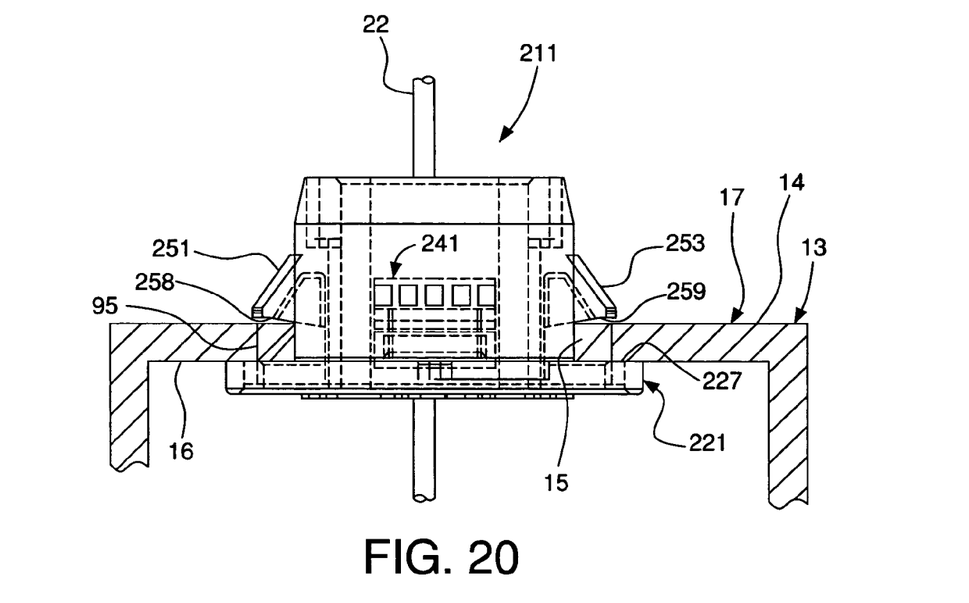
FIG. 20 is a front elevational view in partial cross section of an electrical connector inserted in an electrical box.

As shown in FIGS. 6 and 7 an electrical connector 11 has been inserted through the opening 15 in the electrical box 13. The electrical connector 11 is inserted through the electrical box opening 15 from within the electrical box, thereby providing a major portion of the electrical connector outside the electrical box with only a minor portion of the connector remaining within the electrical box. As the electrical connector 11 passes through the opening 15 in the electrical box 13, the first and second tabs 51 and 53 of the connector flex inwardly to allow the connector to pass through the opening. Once the lower edges 58 and 59 of the tabs 51 and 53 pass through the electrical box opening 15, the tabs return to their original position. The tabs 51 and 53 and the base 21 retain the electrical connector 11 in the electrical box opening 15. The lower edges 58 and 59 of the first and second tabs 51 and 53 are positioned adjacent the outer surface 14 of the box wall 17. The upper surface 27 of the base 21 is positioned proximal the inner surface 16 of box wall 17. The outer diameter of the connector base 21 is larger than the diameter of the opening 15 in the box wall 17 to prevent the electrical connector 11 from being pulled through the box wall, as shown in FIGS. 6 and 7. The lower edges 58 and 59 of the first and second tabs 51 and 53 extend beyond the electrical box opening 15 onto the outer surface 14 of the box wall 17 to prevent the electrical connector 11 from being pushed into the electrical box 13. As shown in FIG. 20, an electrical connector 211 according to the second embodiment is inserted through an opening 15 in the electrical box 13 in a substantially similar manner.

The fingers 41 and 42 of the connector 11 extend inwardly toward the base 21 of the connector to facilitate inserting electrical cable 22 into the electrical box 13 through the box opening 15. The inwardly extending fingers 41 and 42 also increase the force required to pull the cable back out through the connector, thereby securely retaining the electrical cables 22 in the connector.

The opening 15 in the electrical box wall 17 may be a multi-stage knockout. The inner knockout is removed to provide the opening 15 in the electrical box 13. The outer knockout 95 of the multistage knockout remains in the electrical box wall 17, as shown in FIGS. 6, 7 and 20. Insertion of the electrical connector 11 into the opening 15 of the multi-stage knockout is the same as described above. The outer diameter of the connector base 21 overlies beyond the outer knockout 95 to contact at least a portion of the inner surface 16 to prevent the connector 111 and outer knockout 95 from being pulled out from the electrical box 13. As described above, the outer knockout 95 is formed by punching the knockout outwardly from the wall of the electrical box. The metal around the knockout is displaced outwardly during the punching process so that the outer knockout 95 cannot go back through the opening from which it was punched. Therefore, although the first and second tabs 51 and 53 may not extend beyond the outer knockout 95, forces exerted inwardly on a cable 22 retained by the fingers 41 and 42 of the connector 11 will not push the outer knockout back in through the electrical box.

The second and third embodiments of the electrical connector 211 and 311 are secured to the electrical box 13 in substantially the same manner as the first embodiment of the electrical connector 11, with an electrical connector 211 according to the second embodiment being shown inserted in an electrical box 13 in FIG. 20.

While advantageous embodiments have been chosen to illustrate the invention, it will be understood by those skilled in the art that various changes and modifications may be made therein without departing from the scope of the invention as defined in the appended claims.

What is claimed is:

1. A connector for an electrical box, comprising:
   a base having an opening;
   a wall extending from an upper surface of said base and forming a cavity aligned with said opening to form a passageway through said connector to receive electrical cable;
   at least two fingers extending inwardly and toward said upper surface of said base from an inner surface of said wall; and
   at least two tabs extending outwardly and toward said upper surface of said base from an outer surface of said wall to retain the electrical box between said at least two tabs and said upper surface of said base such that said upper surface is proximate to electrical box.

2. The connector of claim 1, wherein
   said at least two fingers are resiliently connected to said inner surface of said wall.

3. The connector of claim 1, wherein
   said at least two tabs are resiliently connected to said outer surface of said wall.

4. The connector of claim 1, wherein
   said at least two fingers have an arcuate surface for retaining the electrical cable in said passageway.

5. The connector of claim 1, wherein
   said at least two fingers includes first and second diametrically opposed fingers.

6. The connector of claim 1, wherein
   said at least two tabs includes first and second diametrically opposed tabs.

7. The connector of claim 1, wherein
   said connector is unitarily formed.

8. The connector of claim 1, wherein said connector is made of plastic.
9. The connector of claim 1, wherein said base has a substantially circular outer perimeter.
10. The connector of claim 1, wherein each of said at least two fingers has a recess at a distal end.
11. The connector of claim 10, wherein said recesses are substantially arcuate.
12. The connector of claim 11, wherein said recesses are substantially semi-circular.
13. The connector of claim 1, wherein each of said at least two fingers has a stepped surface at a distal end.
14. The connector of claim 1, wherein each of said at least two tabs has a lower surface angled away from said base.
15. The connector of claim 14, wherein said lower surfaces have an angle of approximately 13 degrees.
16. The connector of claim 1, wherein each of said first and second fingers has an angled portion at a distal end.
17. The connector of claim 16, wherein said angled portions have an angle of approximately 40 degrees.
18. A connector for an electrical box, comprising:
a base having inner and outer perimeters, said inner perimeter defining an opening through said base;
a first wall extending from said inner perimeter;
a second wall extending from said inner perimeter;
a third wall connecting said first and second walls;
a fourth wall connecting said first and second walls;
first and second fingers extending inwardly and toward said base from an inner surface of said first and second walls, respectively; and
first and second mounting tabs extending outwardly and toward said base from said third and fourth walls, respectively, said first and second mounting tabs having a surface.
19. The connector of claim 18, wherein said third and fourth walls are substantially parallel.
20. The connector of claim 18, wherein said connector is unitarily formed.
21. The connector of claim 18, wherein said connector is made of plastic.
22. The connector of claim 18, wherein said outer perimeter of said base is substantially circular.
23. The connector of claim 18, wherein said first and second fingers are diametrically opposed.
24. The connector of claim 18, wherein said first and second mounting tabs are diametrically opposed.
25. The connector of claim 18, wherein said first and second fingers have an arcuate surface to facilitate retention of electrical cable.
26. The connector of claim 18, wherein each of said first and second fingers has a recess at a distal end.
27. The connector of claim 26, wherein said recesses are substantially arcuate.
28. The connector of claim 27, wherein said recesses are substantially semi-circular.
29. The connector of claim 18, wherein each of said first and second fingers has a stepped surface at a distal end.
30. The connector of claim 18, wherein each of said first and second mounting tabs has a lower surface angled away from said base.
31. The connector of claim 30, wherein said lower surfaces have an angle of approximately 13 degrees.
32. The connector of claim 18, wherein each of said first and second fingers has an angled portion at a distal end.
33. The connector of claim 32, wherein said angled portions have an angle of approximately 40 degrees.
34. A method of inserting a connector in an opening of an electrical box, comprising the steps of: inserting the connector through the Opening of the electrical box from inside the electrical box; positioning at least two tabs of the connector that extend outwardly and toward a base of the connector proximal an outer surface of the wall of the electrical box; and positioning an inner surface of the base of the connector proximal an upper surface of the wall of the electrical box, inserting electrical cable through an opening in the connector; and retaining the electrical cable in the connector opening with at least two fingers extending inwardly and toward the base of the connector.
35. The method of claim 34, wherein said inserting the connector step comprises inserting the connector through a two-stage knockout of the electrical box; and
said positioning an inner surface of the base step comprises positioning a portion of the base to extend beyond a perimeter of the two-stage knockout opening.
36. The method of claim 34, wherein said inserting the connector comprises inserting the connector through the opening of the electrical box so that a major portion of the connector is outside the electrical box.

* * * * *